United States Patent [19]
Coke

[11] Patent Number: 5,455,915
[45] Date of Patent: Oct. 3, 1995

[54] COMPUTER SYSTEM WITH BRIDGE CIRCUITRY HAVING INPUT/OUTPUT MULTIPLEXERS AND THIRD DIRECT UNIDIRECTIONAL PATH FOR DATA TRANSFER BETWEEN BUSES OPERATING AT DIFFERENT RATES

[75] Inventor: James Coke, Cameron Park, Calif.

[73] Assignee: Intel Corporation, Santa Clara, Calif.

[21] Appl. No.: 168,765

[22] Filed: Dec. 16, 1993

[51] Int. Cl.$^6$ ................................................. G06F 13/00
[52] U.S. Cl. .................. 395/325; 370/85.9; 395/421.01; 364/926.91; 364/927.98; 364/935.4; 364/935.41; 364/DIG. 2; 364/238; 364/238.2; 364/238.6
[58] Field of Search ..................... 395/800, 200, 395/250, 325, 725; 864/DIG. 1, DIG. 2; 370/85.9, 85.11, 85.13, 85.14; 340/825.05

[56] References Cited

U.S. PATENT DOCUMENTS

| | | | |
|---|---|---|---|
| 4,339,793 | 7/1982 | Marenin | 395/775 |
| 4,438,490 | 3/1984 | Wilder, Jr. | 395/575 |
| 4,627,050 | 12/1989 | Johnson et al. | 340/825.05 |
| 4,807,109 | 2/1989 | Farrell et al. | 395/325 |
| 5,191,581 | 3/1993 | Woodbury et al. | 370/85.9 |
| 5,305,442 | 4/1994 | Pedersen et al. | 395/325 |
| 5,333,276 | 7/1994 | Solari | 395/325 |

OTHER PUBLICATIONS

Maria C. Yuang, "MRACMAN: A High-Throughput Backbone Metropolitan Area Network Using Simplified Bridges"; Supercomm/ICC 1992 IEEE.
"82420/82430 PCIset EISA Bridge 82374EB/SBEISA System Component (ESC) 82375EB/SB PCI-EISA Bridge (PCEB)", Intel Corporation, 1993.
"82423TX Data Path Unit (DPU)", Intel Corporation, 1994.
"82424 Cache and DRAM Controller (CDC)", Intel Corporation, 1994.

*Primary Examiner*—Alyssa H. Bowler
*Assistant Examiner*—Meng-Ai T. An
*Attorney, Agent, or Firm*—Blakely, Sokoloff, Taylor & Zafman

[57] ABSTRACT

A bridge circuit adapted to be associated with a first and a second bus circuit which includes a first unidirectional path including a buffer for storing read data or addresses, a second unidirectional path including a buffer for storing write data or addresses, a third direct unidirectional path, an input circuit for multiplexing data or addresses from either of the first or second bus circuits, an output circuit for transferring data from any of the three unidirectional paths to either the first or the second bus circuit, and sources of signals for controlling the particular unidirectional path taken depending on the transfer operation being accomplished.

7 Claims, 4 Drawing Sheets

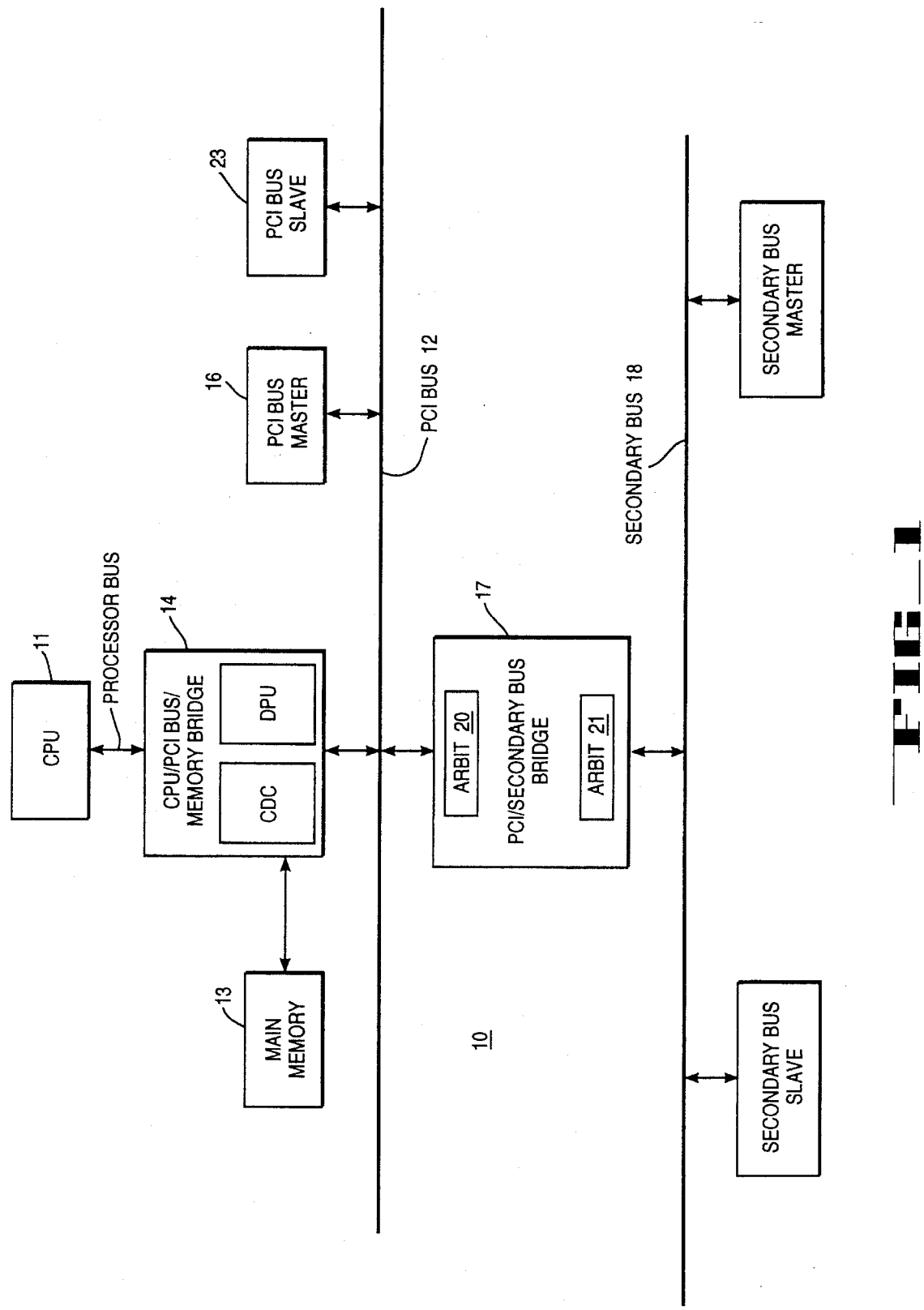

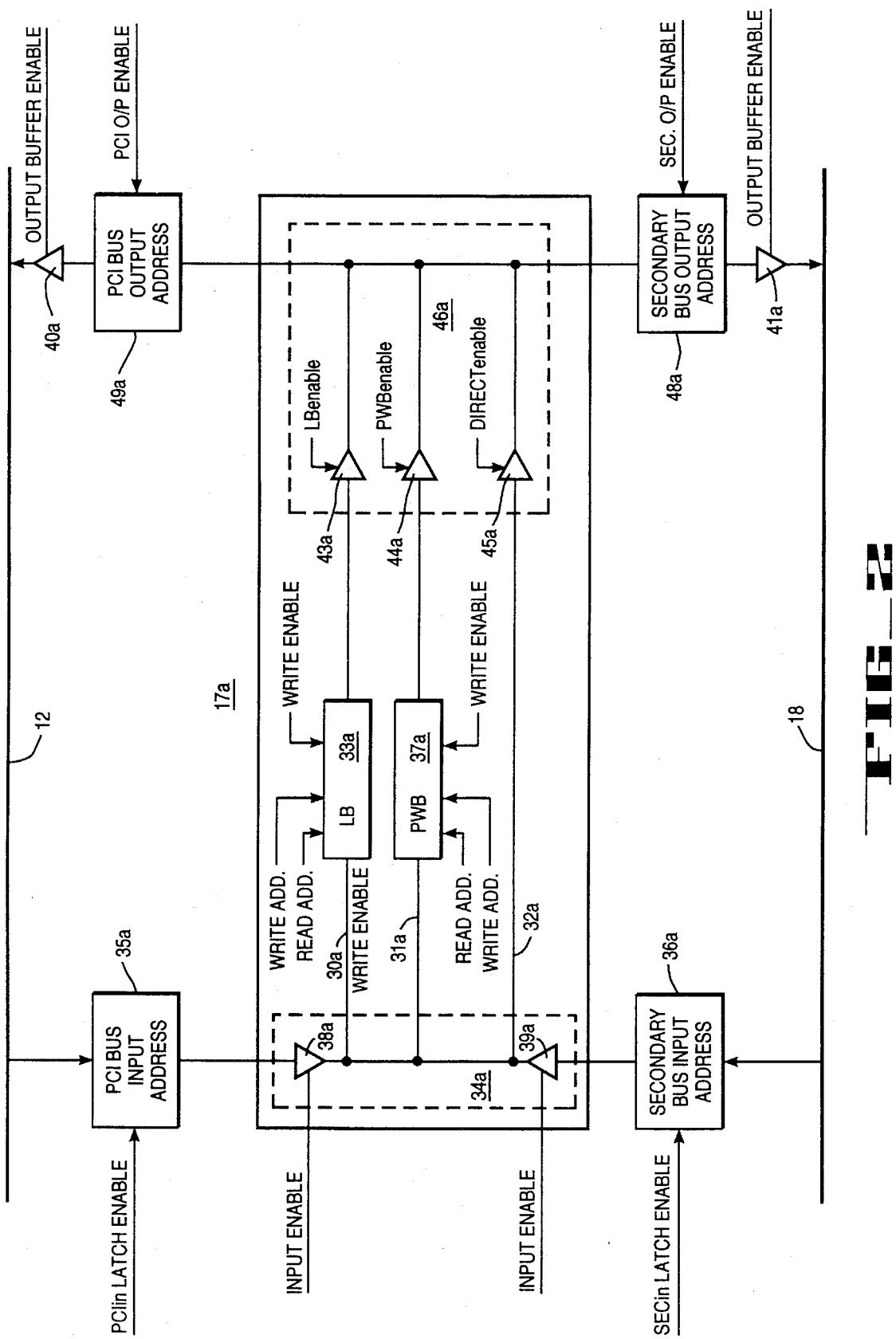
FIG._22

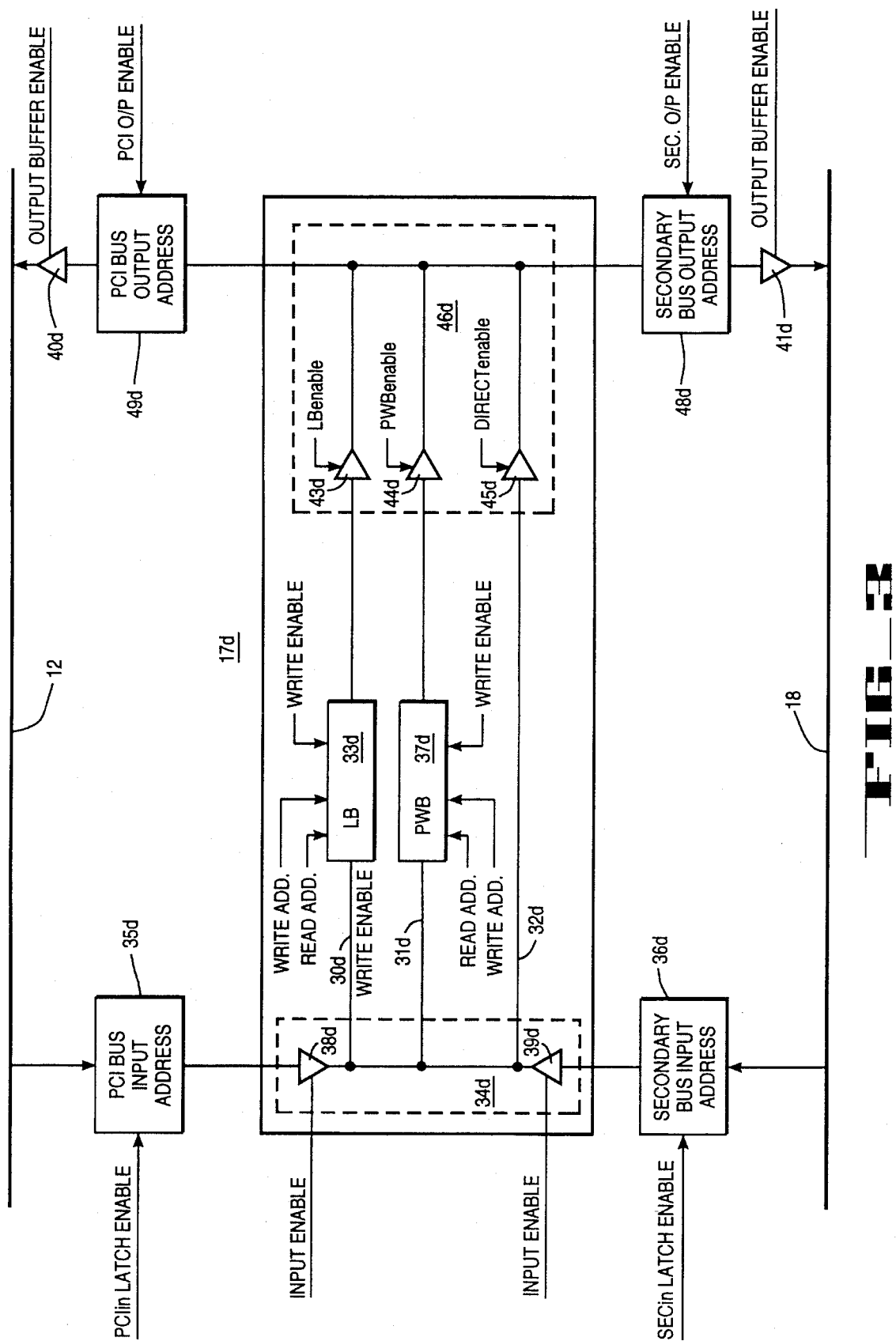
FIG_3

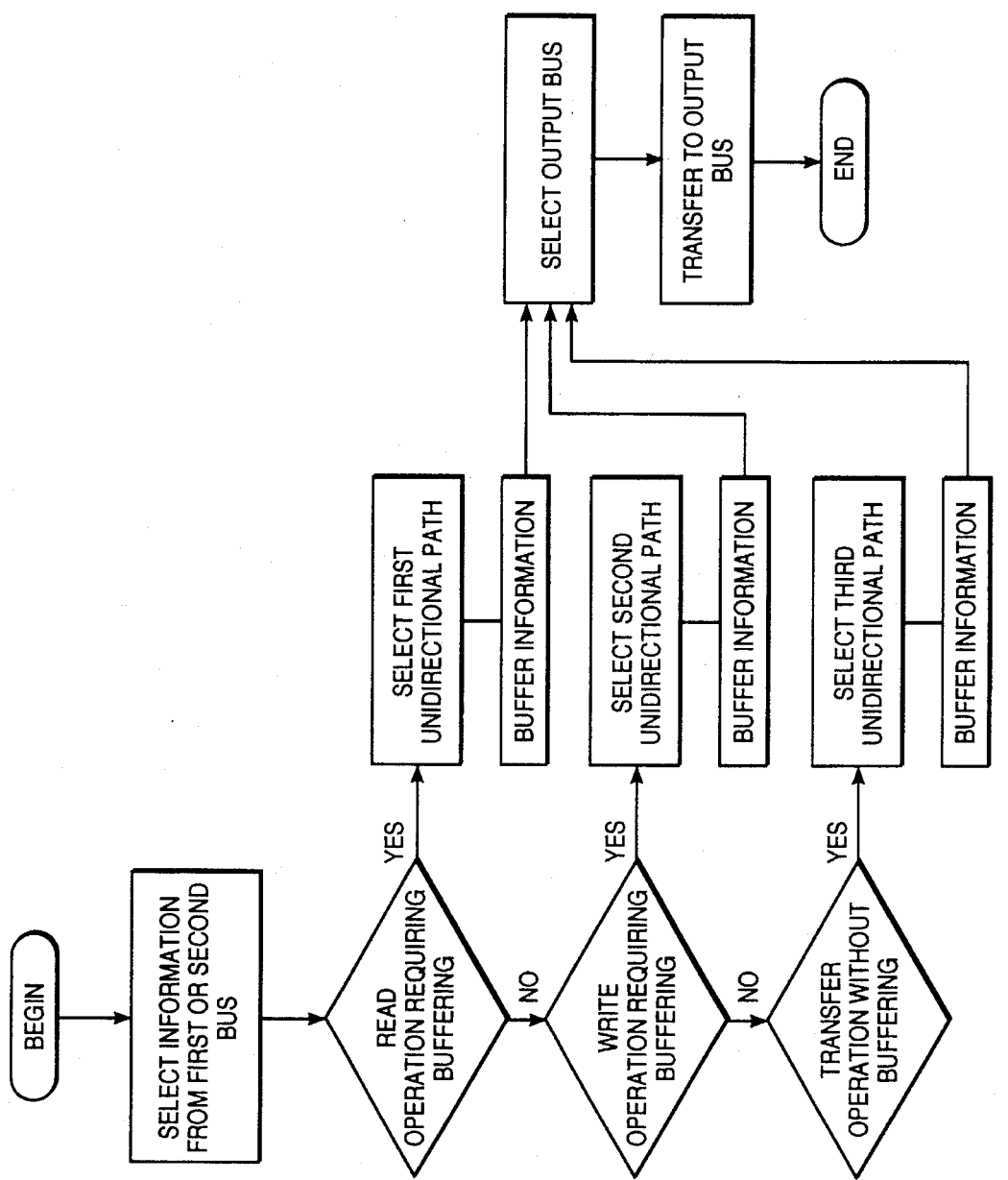
FIG_4

COMPUTER SYSTEM WITH BRIDGE CIRCUITRY HAVING INPUT/OUTPUT MULTIPLEXERS AND THIRD DIRECT UNIDIRECTIONAL PATH FOR DATA TRANSFER BETWEEN BUSES OPERATING AT DIFFERENT RATES

BACKGROUND OF THE INVENTION

1. Field of the Invention

This invention relates to computer systems, and more particularly, to methods and apparatus for accelerating the transfer of data in a computer system utilizing multiple buses.

2. History of the Prior Art

Historically, personal computers have utilized a single bus to transfer data between different internal components of the system. In personal computers using central processing units designed and manufactured by Intel Corporation of Santa Clara, Calif., such buses have typically been designed as either an Industry Standard Association (ISA) bus or an Expanded Industry Standard Association (EISA) bus. The ISA bus is a sixteen bit data bus while the EISA bus is thirty-two bits wide. These bus widths and the rates at which each of these buses is capable of operating have been found limiting so there have been a number of attempts to increase bus speed.

One recently implemented method of increasing bus speed is to provide an additional, so called, "local bus" which is more closely associated with the central processor than either of the above-mentioned buses and which is capable of running at speeds that more closely approximate the speed at which the processor itself runs. Those system components which require faster operation than has been available using the slower buses (such as an output display card for an output display device) are joined to this faster local bus. The slower ISA or EISA bus is continued in essentially unchanged form, and those components which are able to tolerate longer access times are associated with the slower bus. Although the theory behind using a local bus is good, many local bus designs have created conflicts in accessing components which actually slowing the operation of the computer.

Intel Corporation has designed a new local bus which may be associated in a computer system including an Intel processor with other buses such as an ISA bus or an EISA bus (which are hereinafter referred to broadly as secondary buses). This new local bus provides faster throughput of data for selected components of the system without the conflicts which arise using other local bus systems. This new bus is referred to as the "peripheral component interconnect" (PCI) bus. A computer system using this PCI bus includes in addition to the physical PCI bus a first bridge circuit which controls the transfer of data among the PCI bus, the central processing unit, and main memory. A second bridge circuit is also arranged to control the transfer of data between the secondary bus and the PCI bus. Thus, the arrangement is such that components on the PCI bus transfer data to and receive data from main memory through the first bridge which joins to the central processor and to the main memory; while components on the secondary bus transfer and receive data through the second bridge and through the PCI bus for transfers with components on the PCI bus, and through the second and first bridges and the PCI bus for transfers with the central processor and the main memory.

Various designs of secondary bridges have been proposed. One design specifically utilized to transfer data and addresses between the PCI bus and an ISA bus is referred to as an SIO bridge. Such a bridge is described in detail in a publication entitled 82420/82430 PCIset, ISA and EISA Bridges, 1993, Intel Corporation. One of the problems of this and other bridge circuits is that since the transfer must go in both directions between the buses, the circuitry for accomplishing the transfer often becomes quite complicated. Thus, it has been found to be very difficult to provide data rapidly without a substantial number of clock delays between the two buses connected by the secondary bridge.

SUMMARY OF THE INVENTION

It is, therefore, an object of the present invention to provide an improved bridge circuit capable of rapidly transferring data and addresses between buses in a multiple busing system.

It is another more specific object of the present invention to provide an improved bridge circuit capable of rapidly transferring data and addresses to and from both a PCI bus and a secondary bus in a multiple busing system.

These and other objects of the present invention are realized in a bridge circuit adapted to be associated with first and second bus circuits which bridge circuit includes a first unidirectional path including a buffer for storing read data or addresses, a second unidirectional path including a buffer for storing write data or addresses, a third direct unidirectional path, an input circuit for accepting data or addresses from either of the first or second bus circuits, an output circuit for transferring data from any of the three unidirectional paths to either the first or the second bus circuit, and sources of signals for controlling the particular unidirectional path taken depending on the transfer operation being accomplished.

These and other objects and features of the invention will be better understood by reference to the detailed description which follows taken together with the drawings in which like elements are referred to by like designations throughout the several views.

BRIEF DESCRIPTION OF THE DRAWINGS

FIG. 1 is a block diagram of a computer system including a plurality of buses including at least a PCI bus and a secondary bus.

FIG. 2 is a block diagram of a first bridge circuit for connecting a PCI bus and a secondary bus in accordance with the present invention.

FIG. 3 is a block diagram of a second bridge circuit for connecting a PCI bus and a secondary bus in accordance with the present invention.

FIG. 4 is a flow chart illustrating a method of practicing the present invention.

Notation and Nomenclature

Some portions of the detailed descriptions which follow are presented in terms of symbolic representations of operations on data bits within a computer memory. These descriptions and representations are the means used by those skilled in the data processing arts to most effectively convey the substance of their work to others skilled in the art.

The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Referring now to FIG. 1, there is illustrated a computer system 10. The system 10 includes a central processor 11 such as an Intel i486™ microprocessor which carries out the various instructions provided to the computer 10 for its operations. The central processor 11 is coupled to a bus 12 adapted to carry information to various components of the system 10. The bus 12 is designed as a PCI bus in order to allow the transfer of data to and from the central processor 11 at a rate faster than is possible utilizing the typical ISA or EISA buses used by the prior art. The processor 11 is coupled to the bus 12 by a bridge circuit 14 which is adapted to provide various functions necessary to the transfer. Also coupled to the PCI bus 12 by the bridge circuit 14 is main memory 13 which is typically constructed of dynamic random access memory arranged in a manner well known to those skilled in the prior art to store information during a period in which power is provided to the system 10. The bridge circuit 14 is physically constructed to include both a cache and dram controller (CDC) chip and a data path unit (DPU) chip each of which is manufactured by Intel Corporation of Santa Clara, Calif. Detailed descriptions of these chips are provided in *Cache & DRAM Controller (CDC) 82424TX* and *Data Path Unit (DPU) 82423TX*, each published by Intel Corporation. The bridge 14 includes circuitry for interfacing the CPU 11 and main memory 13 to the bridge 14, for interfacing the bridge 14 to the PCI bus 12 as either a bus master or a bus slave, and cache control and data synchronization circuitry. In general, the bridge circuit 14 includes circuitry for controlling and accomplishing the transfer of data among the CPU 11, main memory 13, and the PCI bus 12.

Also connected to the PCI bus 12 by another bridge circuit is a PCI bus master circuit 16 which may one of a number of different component circuits. The main properties of a PCI bus master are that it includes a microprocessor which functions at some internal clock rate and that it may initiate and control operations on the PCI bus 12. Also connected to the PCI bus 12 is a PCI slave circuit 23 which may be connected to a circuit such as a video output card which includes a frame buffer adapted to store video signals to be transferred to an output device such as a monitor for display.

The PCI bus 12 may also be coupled to circuitry (not shown) which is adapted to accomplish the same bridging functions for its connected component circuits as does the circuit 14. Such a circuit may include, for example, various bus master and bus slave interfacing components which allow the interconnection of another bus and its associated components to the PCI bus 12.

Also connected to the PCI bus 12 is a PCI/secondary bus bridge circuit 17. The bridge circuit 17 performs the various functions necessary to transfer data between the PCI bus 12 and various component circuits coupled to a secondary bus 18. The secondary bus 18 may be an ISA bus or a EISA bus, either of which is capable of handling less data than is the bus 12 during a particular time period. One specific PCI to ISA bus bridge circuit 17 is a part of a chip referred to as a "system input/output" (SIO) circuit manufactured by Intel Corporation. Such a bridge is described in detail in the publication referred to above entitled 82420/82430 *PCIset, ISA and EISA Bridges*. Such a bridge 17 includes circuitry for providing the interface between the PCI bus 12 and the secondary bus 18 so that data may be transferred therebetween. The bridge 17 provides circuitry which allows it to operate as an intercoupling bus master or a bus slave on the PCI bus 12. The ability of the bridge 17 to act as a PCI bus master allows a bus master circuit 19 positioned on the secondary bus 18 (for example, local area network (LAN) circuitry) to gain access to the PCI bus 12 and thence to the main memory. The bridge 17 may also include a first arbiter circuit 20 for controlling access to the PCI bus 12 and a second arbiter circuit 21 for controlling access to the secondary bus 18.

One of the problems exhibited by the SIO bridge which may be used as bridge 17 in an architecture in which the secondary bus is an ISA bus is that the arrangement for transferring data and addresses between each of the PCI and the secondary buses is quite complicated and tends to slow those transfers. For this reason, an improved architecture for accomplishing the transfer is desirable.

FIG. 2 is a block diagram which illustrates an improved bridge circuit 17a. The circuit 17a includes, apart from the arbitration and other circuitry discussed above, three individual unidirectional paths which may transfer addresses between the PCI bus 12 and a secondary bus 18. The circuit 17a illustrated in FIG. 2 is utilized for the transfer of addresses between the buses but an essentially identical circuit 17d (shown in FIG. 3) is utilized for the associated transfer of data between the buses. From this point on in the description, unless otherwise specified, it will be assumed that the discussion refers to either one of these circuits and that either data or addresses may be handled in essentially the same manner by the circuit being discussed. In order to make the explanation clearer, the same designations are used for the same components in each of the circuits except that an "a" for "address" is appended to the number designating a component in the circuitry used for address while a "d" for "data" is appended to the number designating a component in the circuitry used for data.

The first of these paths 30(*a* or *d*) includes a line buffer 33(*a* or *d*) in which information (addresses or data) may be stored which is being transferred during read operations. Typically information is stored in this buffer when a read transfer is being accomplished from the faster to the slower bus, i.e., when the slower secondary bus is reading from the PCI to the secondary bus. Since the PCI bus handles information much more rapidly than does the secondary bus, it is not usually necessary to store information in the line buffer 33(*a* or *d*) when the information is being read by the PCI bus from the secondary bus. The second path 31 (*a* or *d*) includes a posted write buffer 37(*a* or *d*) in which information being written from the faster to the slower bus is typically stored. The third unidirectional path is essentially a direct connection 32(*a* or *d*) for information which need not (or may not) be stored during transfer between the buses. This third unidirectional path 32 allows data to be taken directly from memory and transferred to the secondary bus without buffering.

Each of these three unidirectional paths is connected to receive input signals transferred by a multiplexor 34(*a* or *d*). In the figure which represents only one embodiment of the invention, the multiplexor 34 is represented by a pair of tristate devices 38(*a* or *d*) and 39(*a* or *d*) which may be enabled to allow input from either of the buses. The multiplexor 34(*a* or *d*) receives input signals (addresses) from input latches 35(*a* or *d*) and 36(*a* or *d*) connecting to each of the two buses 12 and 18 under control of enabling signals furnished in response to operation of the arbitration circuitry referred to above. Only one of the two buses may transfer signals at any instant. Consequently, only one of the inputs to the multiplexor 34(*a* or *d*) from the latches will be selected at any time. Each of the three paths is also connected to provide outputs to a pair of output buffer circuits 40(*a* or *d*) and 41(*a* or *d*) which, may be enabled under control of the arbitration circuits to transfer the addresses to either the secondary bus or the PCI bus. Consequently, any set of addresses or any amount of data may be sent from either the PCI bus or the secondary bus to the other one of the two buses through any of the unidirectional paths without having to transit any significant circuitry or gating which might require clock delays in the transfer.

As may be seen, each of the three unidirectional paths includes a tristate device 43(*a* or *d*), 44(*a* or *d*), or 45(*a* or *d*) which when enabled allows the transfer of addresses or data through that particular path from the sending bus to the receiving bus. Each of the two unidirectional paths which includes a storage buffer 33(*a* or *d*) or 37(*a* or *d*) also includes circuitry for furnishing read and write and write enable signals to that buffer so that the correct storage buffer and path may be selected for the particular operation which is taking place. It should be noted that the three tristate devices 43(*a* or *d*), 44(*a* or *d*), or 45(*a* or *d*) are one embodiment of what may be considered to be a multiplexor 46(*a* or *d*) to a single output path leading to each of the two buses 12 and 18.

FIG. 4 is a flow chart which describes the process by which either of the circuits 17*a* or 17*b* functions. For example, when a bus master on the secondary bus desires to read from main memory, the address from which the data is to be read is transferred by the bus master to the bridge 17*a*. The secondary bus input address latch 36*a* is enabled and transfers the address to the tristate device 39*a* of the multiplexor 34*a*. The tristate device 39*a* (in this embodiment) of the multiplexor 34*a* is enabled and selects the address from the secondary bus for transfer to the line buffer 33*a*. The line buffer 33*a* reads and stores the address data. Because the slower secondary bus is accessing data stored on a component joined to the faster PCI bus, the read access by the slower bus must be accomplished in sequential segments so that storage in the line buffer during the read is used. At the same time, a read request for the PCI bus is sent by the bus master on the secondary bus to the secondary bus arbitration circuitry and transferred to the PCI bus arbitration circuitry. This request ultimately causes a read cycle to be initiated using the address stored in the line buffer 33*a*. The data selected from the addressed position in main memory is then transferred onto the PCI bus 12 and appears at the input to the PCI input data latch 35*d*. The latch 35*d* is enabled, and the multiplexor 34*d* selects the data from the PCI bus 12. Simultaneously, the line buffer 33*d* is enabled to receive the data being transferred. In the meantime, the data will have begun to be read to the secondary bus from the line buffer 33*d* under control of signals initiated by the secondary bus arbitration circuitry. These signals include write enable signals transferred to the line buffer 33*d*, line buffer enable signals transferred to the tristate device 43*d*, secondary bus output enable signals for operating the secondary bus output circuit 48*d* (a latch in the preferred embodiment), and output buffer enable signals for enabling the output buffer 41*d*.

If a PCI master desires to read from a device on the secondary bus, operations of the same type occur. The arbitration circuitry selects the particular bus master on the PCI bus to which it will grant control of the bus during any particular period. That bus master initiates a requests to the secondary bus arbitration circuitry and ultimately gains access to the bus. The PCI bus master then initiates an operation which transfers data between the buses by sending an address and a read request. The address flows through the PCI bus input latch 35*a* and the tristate device 38*a* and is read through the path including the tristate device 45*a* directly to the secondary bus output address latch 48*a* and the output buffer 41*a*. Simultaneously, the read request is being processed and the data is accessed at the desired memory position on the secondary bus 18. Ultimately, the data appears at the secondary bus input data latch 36*d*, and enabling signals initiated by the arbitration circuitry allow the data to flow through the latch 36*d* and the tristate device 39*d* so that the multiplexor may allow the transfer of the data to the correct one of the three paths. In the case in which a PCI master reads from the secondary bus, the direct path is utilized for the transfer of data since the data is transferred from the secondary bus at a rate much slower than the PCI master is typically capable of handling it; this requires that an enabling signal be provided to the tristate device 45*d*. The data is transferred to the PCI bus 12 by enabling the PCI bus output data latch circuit 49*d* and the output buffer circuit 40*d*.

When a bus master on the secondary bus desires to write to main memory, the address from which the data is to be written is transferred by the bus master to the bridge 17*a*. The secondary bus input address latch 36*a* is enabled and transfers the address to the tristate device 39*a* of the multiplexor 34*a*. The tristate device 39*a* of the multiplexor 34*a* is enabled and selects the address from the secondary bus for transfer to the PCI bus using the direct path through the tristate device 45*a*. At the same time, a write request for the PCI bus is sent by the bus master on the secondary bus to the secondary bus arbitration circuitry and transferred to the PCI bus arbitration circuitry. This request ultimately causes a write cycle to be initiated. The data is then transferred onto the secondary bus 18 and appeals at the input to the secondary input data latch 36*d*. The latch 36*d* is enabled, and the multiplexor 34*d* selects the data from the secondary bus 18. Simultaneously, the direct path through the tristate device 45*d* is enabled to transfer the data directly to the multiplexor 46*d*. In the mean time, the data will have begun to be transferred to the PCI bus under control of signals initiated by the bus arbitration circuitry. These signals include PCI bus output enable signals for operating the PCI bus output latch circuit 49*d*, and output buffer enable signals for enabling the output buffer 40*d*.

For write operations to the secondary bus, both the address and the data are stored in the posted write buffer 37*a* and 37d. As with previously detailed operations, the output of the selected path is provided by the signals initiated by the arbitration circuitry which select the bus to which the data is directed.

The present invention might also be used in situations in which the two buses actually function at the same operating speed. For example, if a fast secondary bus is joined to the PCI bus 12 as by another bridge circuit, a bridge circuit designed in accordance with the present invention would provide a reasonable solution to transferring data and addresses between the two buses. In such a case, the transfer in each of the two directions might utilize the storage provided by the buffer 33 and 37 in each of the circuits of FIGS. 2 and 3.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer system comprising:
    a central processing unit (CPU) having a characteristic operating speed;
    a main memory;
    a first bus operating at a first rate that approximates the characteristic operating speed of the CPU, the first bus being coupled to the CPU and the main memory;
    a first bus master coupled to the first bus;
    a secondary bus operating at a second rate which is substantially slower than the first rate;
    a second bus master coupled to the secondary bus;
    a device for storing data coupled to the secondary bus;
    a bridge circuit for transferring information between the first and the secondary buses comprising address and data circuits, said bridge circuit includes:
    a first unidirectional path including a line buffer;
    a second unidirectional path including a write buffer;
    a third direct unidirectional path;
    first multiplexer (MUX) means for coupling input address/data information from either the first or secondary buses to either the first, second or third unidirectional paths;
    second multiplexer (MUX) means for coupling output address/data information from either the first, second or third unidirectional paths to either the first or secondary buses;
    bus arbitration circuitry for arbitrating access to the first and secondary buses and for controlling the first and second MUX means;
    in an event of a read request by the second bus master to the main memory, the bus arbitration circuitry causing the first MUX means of the address circuit to store a read address provided by the second bus master in the line buffer, then, using the read address stored in the line buffer, the bus arbitration circuitry initiating a read cycle such that the second MUX means transfers read data from the main memory onto the first bus, the bus arbitration circuitry thereafter causing the first MUX means of the data circuit to store the read data in the line buffer and then cause the second MUX means to transfer the read data to the secondary bus.

2. The computer system of claim 1, wherein in the event of a read request by the first bus master from the device coupled to the secondary bus, the bus arbitration circuitry causing the first and second MUX means of both the address and data circuits to select the third unidirectional path to directly transfer data stored in the device to the first bus master coupled to the first bus.

3. The computer system of claim 2 further wherein in the event of a write request by the second bus master to the main memory, the bus arbitration circuitry causing the first and second MUX means of the address circuitry to transfer a write address from the secondary bus directly across the third unidirectional path to the first bus, the write request also causing the bus arbitration circuitry to initiate a write cycle such that the first and second MUX means of the data circuitry directly transfer write data from the secondary bus to the first bus across the third unidirectional path.

4. The computer system of claim 3 further wherein in the event of a write operation to the secondary bus, the bus arbitration circuitry causing the first MUX means to post both address and data information in the write buffer of the address and data circuitry, respectively, from the first bus, the bus arbitration circuitry then causing the second MUX means to transfer the address and data information to the secondary bus from the write buffer.

5. The computer system of claims 1, 2, 3 or 4 wherein the first MUX means comprises:
    a first latch having an input coupled to the first bus;
    a second latch having an input coupled to the secondary bus;
    a multiplexer having first and second inputs coupled to the outputs of the first and second latches, respectively, the multiplexer having first, second and third outputs coupled to the first, second and third unidirectional paths, respectively.

6. The computer system of claim 5 wherein the first bus comprises a PCI bus.

7. The computer system of claim 6 wherein the secondary bus comprises either an ISA or an EISA bus.

* * * * *